US012467616B2

(12) United States Patent
Riehl et al.

(10) Patent No.: US 12,467,616 B2
(45) Date of Patent: Nov. 11, 2025

(54) MODULAR LIGHT FIXTURE

(71) Applicant: Sabin, LLC, Chicago, IL (US)

(72) Inventors: Samuel Riehl, Chicago, IL (US); Adele Marchiando, Chicago, IL (US); Wes Cox, Chicago, IL (US)

(73) Assignee: SABIN, LLC, Chicago, IL (US)

( * ) Notice: Subject to any disclaimer, the term of this patent is extended or adjusted under 35 U.S.C. 154(b) by 0 days.

(21) Appl. No.: 18/391,283

(22) Filed: Dec. 20, 2023

(65) Prior Publication Data

US 2024/0200762 A1 Jun. 20, 2024

Related U.S. Application Data

(60) Provisional application No. 63/476,347, filed on Dec. 20, 2022.

(51) Int. Cl.

| | |
|---|---|
| ***F21V 21/34*** | (2006.01) |
| ***F21S 8/06*** | (2006.01) |
| ***F21V 15/01*** | (2006.01) |
| ***F21V 21/005*** | (2006.01) |
| ***F21V 23/06*** | (2006.01) |

(52) U.S. Cl.

CPC .............. *F21V 21/34* (2013.01); *F21S 8/061* (2013.01); *F21V 15/01* (2013.01); *F21V 21/005* (2013.01); *F21V 23/06* (2013.01)

(58) Field of Classification Search

CPC ........ F21V 23/06; F21V 15/01; F21V 21/005; F21V 21/34; F21S 8/061

See application file for complete search history.

(56) References Cited

U.S. PATENT DOCUMENTS

| | | | | |
|---|---|---|---|---|
| 11,215,330 | B1 * | 1/2022 | Ross | F21L 4/022 |
| 11,906,141 | B1 * | 2/2024 | Lu | F21V 21/14 |
| 2020/0080708 | A1 * | 3/2020 | Xiao | F21V 17/164 |
| 2022/0221143 | A1 * | 7/2022 | Sharrah | F21V 17/005 |
| 2024/0075324 | A1 * | 3/2024 | Mauthner | A62B 35/0075 |

FOREIGN PATENT DOCUMENTS

| | | | | |
|---|---|---|---|---|
| DE | 202004004838 U1 * | 9/2004 | | F21V 21/35 |
| DE | 102010021113 A1 * | 11/2011 | | F21S 8/038 |
| DE | 102010063735 A1 * | 6/2012 | | F21S 2/005 |
| WO | WO-2011106695 A1 * | 9/2011 | | F21S 4/28 |

OTHER PUBLICATIONS

Innovation Q+ NPL Search (Year: 2024).*

* cited by examiner

*Primary Examiner* — Anabel Ton
(74) *Attorney, Agent, or Firm* — Leydig, Voit & Mayer, Ltd.

(57) ABSTRACT

A lighting arrangement is assembled from a plurality of modular light fixtures that are sequentially aligned along a longitudinal alignment axis. Each modular light fixture includes an exterior cover that is disposed about and define an interior. The exterior covers of a first modular light fixture and an adjoining second modular light fixture are co-planar to appear as a homogenous exterior surface. To facilitate moving the first and modular light fixtures together, a lanyard is extended from a retractor located in the interior of the first modular light fixture and engages a catch located in the interior of the second modular light fixture. The retractor applies a tension force to the lanyard drawing the modular light fixtures together.

20 Claims, 13 Drawing Sheets

MODULAR LIGHT FIXTURE

BACKGROUND

Light fixtures are typically placed overhead to direct light downwards into a room. In some instances, the light fixture may be suspended from the ceiling and is openly exposed within the room. Depending upon the context, such as use in an office environment, it may be desirable to design the light fixture to have an aesthetically pleasing appearance. In such cases, the light fixture may include an exterior cover dispose about the light source to obscure direct exposure to the light source which may be an LED or an electric bulb. The exterior cover can also embody an aesthetically pleasing pattern or appearance that may be desired for the light fixture.

In some configurations, the light fixtures may be configured modularly so that a plurality of light fixtures can be arranged together to provide a continuous common source of light to sufficiently illuminate a room. For example, in a hallway or a large workspace, several modular light fixtures can be arranged end-to-end to provide an elongated, continuously aligned source of light. Modularity enables customization of the arrangement of light fixtures to accommodate differently sized spaces and different lighting pattern configurations.

To promote the aesthetic appearance, the modular light fixtures, when arranged end to end, can abut against each other in a contiguous relation to one another. The adjacent light fixtures can be joined by fastening hardware to provide the appearance of a continuous singular source of light. However, in the context of suspended light fixtures, installation of the modular light fixtures in an aligned, continuous arrangement is often difficult and requires considerable skill.

The present disclosure is directed to a system and method for improving the installation of suspended modular light fixtures.

SUMMARY OF THE DISCLOSURE

The disclosure describes a lighting assembly that includes at least first and second light fixtures that are modularly configured for assembly to produce a uniform structure of adjoining light fixtures that are aligned along a longitudinal axis line. In an embodiment, the light fixtures can be styled as elongated linear panels and can include acoustic dampening exterior covers such that the light fixtures may function as acoustical baffles that can be suspended in an evaluated position in an office workspace. To draw the adjacently located first and second light fixtures into abutting and contiguous contact, the light fixtures can be equipped with a retractor that includes a lanyard which may be flexible line or threaded metal cable. The lanyard can extend from the retractor, that may be attached to a first of the light fixtures to engage and attach with the second of the light fixtures. Further, the retractor can be arranged on the light fixtures so that the lanyard is deployed parallel to or axially aligned with the longitudinal alignment axis of the lighting assembly.

The retractor can be configured to produce a recoiling action that is applied to the lanyard tending to pull or retract the lanyard along the longitudinal alignment axis. To produce the recoiling action, the lanyard can include a spring mechanism such as a spiral torsion spring or a helical coil spring that applies a tensioning force to the lanyard. When the first and second light fixtures are arranged in a linearly aligned and adjacent manner with respect to the longitudinal alignment axis, the tensioning force applied to the lanyard draws the abutment ends of the opposing traverse edges of the first and second fixtures into contiguous adjoining contact.

A possible advantage of the lighting arrangement having a retractor with a deployable lanyard is that lanyard, which may extend between the first and second light fixtures, provides a visible alignment aid for moving the light fixtures into an abutting relation during installation of the lighting assembly. Moreover, the tensioning force applied to the lanyard pulls the opposing abutment ends of the light fixtures into contiguous contact to eliminate gaps and provide a flush, seamless appearance to the lighting assembly. In an embodiment of the retractor, the flexible lanyard may be wound about a spring loaded rotating reel that retrieves the lanyard to reduce sagging of the lanyard and possible interference with assembly. These and other possible advantages of the disclosure will be apparent from the following detailed description and the accompanying drawings.

DETAILED DESCRIPTION OF THE INVENTION

Figure 1:
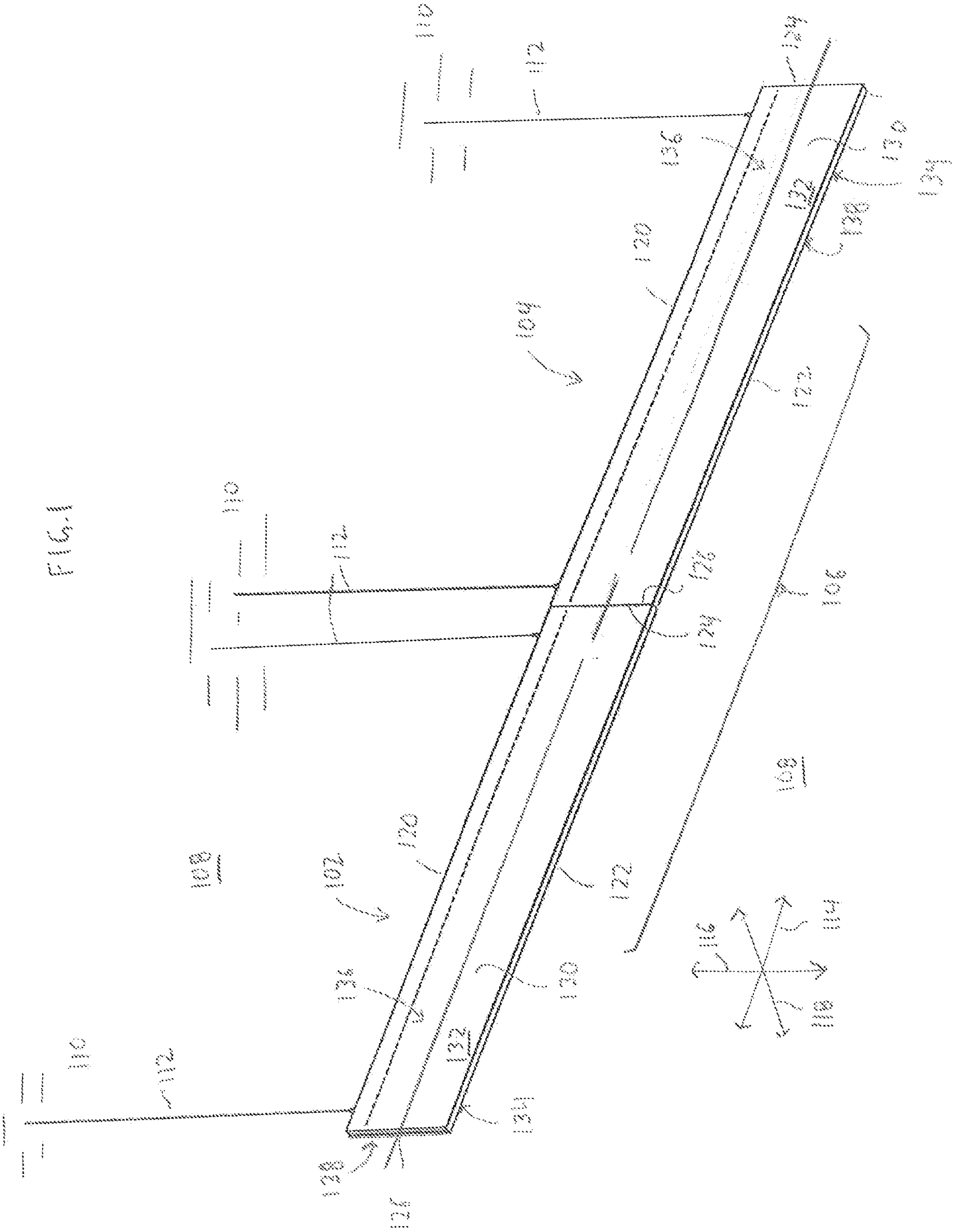
FIG. 1 illustrates a suspended and exposed lighting arrangement including first and second modular light fixtures embodied as linear acoustic baffles and aligned together along a common longitudinal alignment axis, in accordance with an embodiment of the disclosure.

Referring to the figures, where whenever possible like reference numbers refer to like elements, there is illustrated in FIG. 1 a first light fixture 100 and a second light fixture 102 that are arranged and aligned in common with a longitudinal alignment axis 104 to create a suspended lighting arrangement 106 hanging within an opened space 108 such as a room or hallway. To suspend the lighting arrangement 106, the first and second light fixtures 100, 102 are connected to the ceiling 110 of the open space 108 by one or more suspension cables 112, which as an example can be a flexible braiding of metal threads or can be a tie rod. The first and second light fixtures 100, 102 are thus suspended in a visibly exposed configuration within the open space 108.

For reference purposes only, the open space 108 may be associated with coordinates to describe the physical space. The coordinates may include a longitudinal direction 114 that is aligned with and parallel to the longitudinal alignment axis 104 of the first and second light fixtures 100, 102. The vertical direction 116 of the open space 108 may be normal to the longitudinal direction 114 and may be oriented or directed toward the ceiling 110. Further, the lateral direction 118 can be orthogonal to the longitudinal direction 114 and the vertical direction 106 and can correspond to the width or thickness of the light fixtures 100, 102.

For purposes of the disclosure, the first and second light fixtures 100, 102 can be substantially identical in shape and construction. In an embodiment, the first and second light fixtures 100, 102 can be modular and are generally exchangeable to produce the lighting arrangement 106 of adjustable sizes depending upon the number of light fixtures included in the arrangement.

The light fixtures 100, 102 may be elongated, generally polygonal structures including an upper longitudinal edge 120 and a parallel lower longitudinal edge 122 that are normal to and intersect with a first traverse edge 124 and an oppositely spaced second traverse edge 126. The longitudinal edges 120, 122 can align with the longitudinal direction 114 and the traverse edges 124, 126 can align with the vertical direction 116. The longitudinal edges 120, 122 and the traverse edges 124, 126 are straight and orthogonal to each other such that the light fixtures 100, 102 have a rectangular profile. In possible embodiments, the first and second light fixtures may have different geometric profiles.

When suspended in the open space 108, the linear extension of the light fixtures 100, 102 is parallel to and aligns with the longitudinal alignment axis 104. Further, the light fixtures 100, 102 can have flat, planar appearance provided by a relatively thin width in the lateral direction 118 compared with the extension of the longitudinal edges 120, 122 in the longitudinal direction 114 and the traverse edges 124, 126 in the vertical direction 116.

The light source, which is incorporated into the first and second light fixtures 100, 102, may be located proximate to the lower longitudinal edge 122 so that the light can project downwards with respect to the vertical direction 116. For aesthetic purposes, the light source may be located within the interior of the light fixtures 100, 102 so that it remains hidden from view. Examples of suitable light sources include LED lights, incandescent bulbs, or elongated tubes. Further, the light source may extend the linear length of the lower longitudinal edge 122 so that the light fixtures, when aligned together in the light arrangement 106, create a continuous linear source of light that extends the length of the arrangement.

The first and second light fixtures 100, 102 can each have an exterior cover 130 that is assembled from a first exterior panel 132 and a second exterior panel 134 parallel to and spaced apart from the first exterior panel 132. The first and second exterior panels 132, 134 can conform in shape to the rectangular profile defined by the longitudinal edges 120, 122 and the traverse edges 124, 126. To correspond with the flat linear appearance of the light fixtures 100, 102, the first and second exterior panels 132, 134 can be flat and planar in shape and may be spaced apart a minimal distance in the lateral direction 118 to maintain the thinness of the structure. In possible embodiments, the exterior cover 130 can have other constructions such as a continuous sheet that may be folded upon itself or multiple parallel strips of adjoining material.

In an embodiment, the first and second light fixtures 100, 102 can be configured as acoustic baffles and the exterior cover 130 can be made of an acoustically absorptive material. For example, the first and second exterior panels 132, 134 can be made from semi-rigid fibrous material capable of absorbing and dampening soundwaves. When suspended in the open space 108, the light fixtures 100, 102 as embodied as acoustic baffles can modify the acoustic characteristics of the space by reducing reflection and reverberation of the soundwaves. By way of example, the material of the exterior panels 132, 134 can include non-woven felts (e.g., architectural acoustic panels and PET), soft plastics/rubbers, foams of varying density whether synthetic or natural, or any other such similar material. In possible embodiments, the exterior panels 132, 134 can be made from other types of foraminous or porous material to receive and trap soundwaves.

The first and second exterior panels 132, 134 can each define a respective first and second exterior surface 136, 138 that is directed toward and exposed to the open space 108. The exterior surfaces 136, 138 define the surface area of the exterior panels 132, 134 available for impingement and adsorption of soundwaves and can correspond in size to the rectangular area defined by the longitudinal edges 120, 122 and the traverse edges 124, 126. The first and second exterior surfaces 136, 138 can be smooth, even, and continuous to facilitate the appearance of the first and second light fixtures 100, 102 as flat panels or baffles. However, in possible embodiments, the first and second exterior panels 132, 134 may have shapes, patterns, or contours disposed or embossed therein that may be deviate from the illustrated smooth, planer exterior appearance.

When assembled together to create the lighting arrangement 106, the first and second light fixtures 100, 102 are aligned sequentially with respect to the longitudinal alignment axis 104 and joined at opposing traverse edges 124, 126 of the rectangular shapes. When the first and second light fixtures 100, 102 are placed together, it is desirable that they produce an atheistic appearance of a homogenous, unitary, and seamless structure of continuous length. It may also be desirable that the exterior covers 130 of the first and second light fixtures 100, 102 appear to merge as a uniform exterior surface. Further, the exterior surfaces 136, 138 of the first and second exterior panels 132, 134 should be disposed in a coplanar relation so that the exterior covers 130 appear to provide a continuous homogenous surface. Thus, the exterior surfaces 136, 138 of the adjacent first and second light fixtures 100, 102 should be flush and the joint between the abutting first and second traverse ends 124, 126 of the adjacent light fixtures should be seamless.

Figure 2:
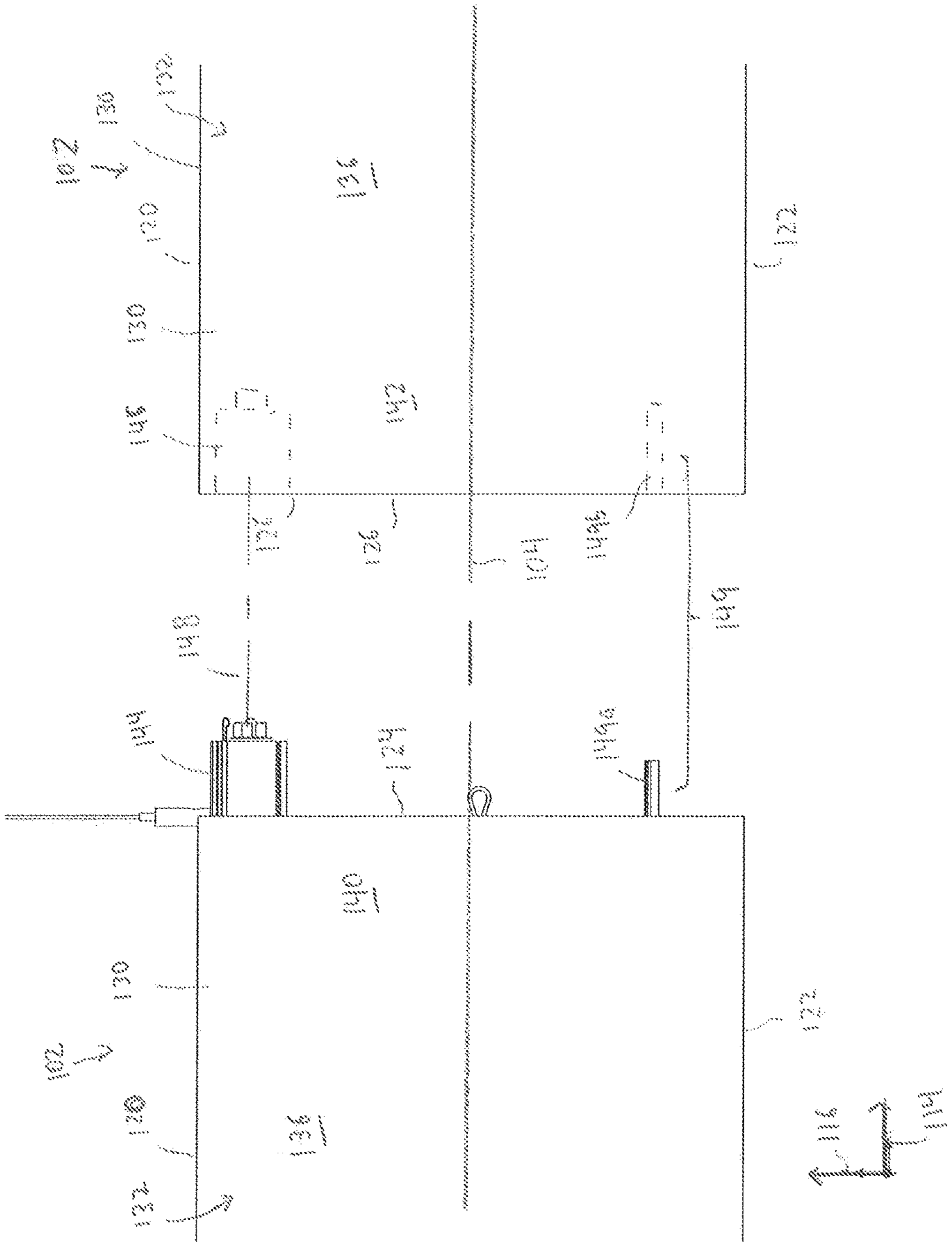
FIG. 2 illustrates a first light fixture and a second light fixture bearing respective exterior covers and aligned in the common longitudinal axis with traverse end faces arranged in an opposed relation.

To facilitate linearly aligning the first and second light fixtures 100, 102 with respect to the longitudinal alignment axis 104 and moving them adjacently together, the longitudinal ends of the light fixtures that correspond to the traverse edges 124, 126 can be configured for abutment and can be referred to as a first abutment end 140, associated with the first light fixture 100, and a second abutment end 142 associated with the second light fixture 102. For example, referring to FIG. 2, the first abutment end 140 of the first light fixture 100 can be located proximate to the first traverse edge 124 and the second abutment end 142 of the second light fixture 102 is located proximate the second traverse edge 126. During installation, the first and second abutment ends 140, 142 are arranged spaced-apart and opposed to each other, and are separated along the longitudinal align axis 104. In the arrangement illustrated in FIG. 2, the first and second light fixtures 100, 102 may be located at a common vertical elevation in the vertical direction 116.

In an embodiment, the first abutment end 140 can include a first connector part 144 that projects from the first traverse edge 124 of the first light fixture 100. A mating second connector part 148 can be located within the second abutment end 142 of the second light fixture 102, as indicated in dashed lines. The first and second connector parts 144, 146 can extend in parallel with the longitudinal axis line 104 and can be aligned with respect to a mating axis 148. The first and second connector parts 144, 146 can be located proximate to the upper longitudinal edges 120 of the first and second light fixtures 100, 102. In an embodiment, the first connection part 144 can be configured to form an electrical connection with the mating second electrical connector part 146 that may be configured as a mating electrical receptacle to communicate electricity between the first light fixture 100 and the adjacent second light fixture 102.

In an embodiment, a second mating connector 149 can be provided and that can include a third projecting connector part 149*a* located proximate the lower longitudinal edge 122 of the first light fixture 100 that can be received in and mate with a fourth recessed connector part 149*b* proximate the lower longitudinal edge 122 of the second light fixture 102. The third and fourth connector parts 149*a*, 149*b* may be non-conductive components.

Figure 3:
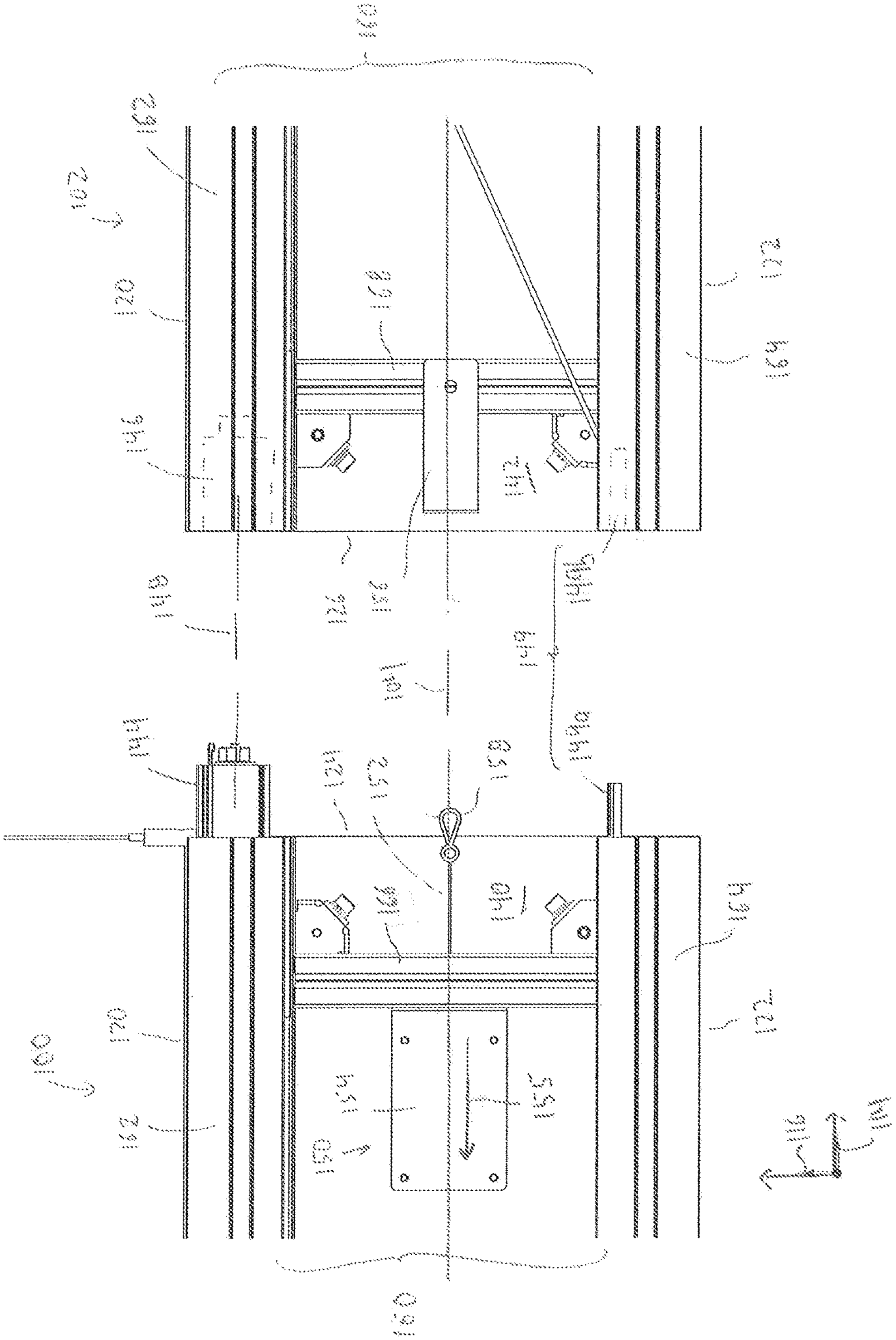
FIG. 3 illustrates the first and second light fixtures with the exterior covers removed to illustrate the fixture interior and an internal support frame, with a retractor located in the first light fixture.

Referring to FIG. 3, to linearly move the first and second abutment ends 140, 142 together along the longitudinal alignment axis 104, the first light fixture 100 can include a retractor 150 located within the interior of the light fixture 102 enclosed by the exterior cover 130. The retractor 150 can include an extendable lanyard 152 that can be extended and retracted with respect to a retractor case 154. The lanyard 152 can be a flexible line or string, or a threaded metal cable, that reels into retractor case 154. The retractor 150 can be arranged inside the first light fixture 100 so that the lanyard 152 is directed and deployable along the longitudinal axis line 104.

The retractor 150 can be configured to produce a recoiling action that is applied to the lanyard 152 tending to retract the lanyard into the retractor case 154 whenever the lanyard is deployed. The retractor 150 thus produces a tensioning force, indicated by arrow 155, tending to pull the lanyard 152 toward the retractor case 154. When the retractor 150 is installed on the traverse brace 166 as illustrated, the tensioning force 155 can generally be parallel to and aligned with the longitudinal alignment axis 104.

To engage with the lanyard 152 when extended from the retractor 150, the second light fixture 102 can include a catch 156 disposed in the interior thereof. In an embodiment, the catch 156 can include a structural protrusion or the like that can be hooked by and engaged with a hook 158 that is included at the distal end of the extendable lanyard 152.

To fix the retractor 150 in location, the light fixtures 100, 102 can each include an internal support frame 160 that can be located within the interior defined by the external cover 130. The support frame 160 can also provide structural support for the external cover 130 and can be configured as a framework or truss. For example, the internal support frame 160 can include a first linear chord 162 located proximate to the upper longitudinal edge 120 and parallel to the longitudinal alignment axis 104. The internal support frame 160 can also include a second linear chord 164 that is located proximate the lower longitudinal edge 122 and parallel to the longitudinal alignment axis 104. The first and second linear chords 162, 164 can be structural metal extrusions that can be configured as channels.

To brace the spaced-apart first and second linear chords 162, 164, the internal support frame 160 can include a first traverse brace 166 and a second traverse brace 168 extending in the vertical direction 116 between the chords. The first traverse brace 166 can be located toward the first abutment end 140 and the second traverse brace 168 can be located toward the second abutment end 142. The first and second traverse braces 166, 168 an also be made from extruded metal and can be configured as channels. The linear cords 162, 164 and the traverse braces 166, 168 of the internal support frame 160 can be orthogonally arranged to form a rectangle and can be attached together by suitable joining mechanisms such as welding or sheet metal fasteners. The internal support frame 160 provides a rigid structure for supporting the external cover 130 that can be the soft, semi-rigid fibrous body. The rigidity of the internal support frame 160 also facilities handling of the light fixtures 100, 102 during installation.

To orientate the retractor 150, the retractor case 154 can be fixed to the first traverse brace 166 that extends parallel to the first traverse edge 124 defined by the external cover 130. The retractor case 154 can be attached to the first traverse brace 166 by magnets, adhesives, or fasteners and can be located approximately midway between the first and second linear chords 162, 164. The retractor case 154 is further situated so the extendable lanyard 146 is directed towards the first traverse edge 124 defining the longitudinally distal extent of the first abutment end 140. Further, the retractor case 154 can be generally disposed within the internal support frame 160 defined between the linear chords 162, 164 and traverse braces 166, 168. In other possible embodiments, the retractor 150 can be attached or situated within the light fixture at different locations or orientations than as illustrated.

To engage with the lanyard 152 extending from the first traverse brace 166, the catch 156 can be oppositely located at and fixed to the second traverse brace 168. The second traverse brace 168 can be spaced-apart with respect to the second traverse edge 126 so that the catch 156 is recessed interior of the second light fixture 102. Moreover, the catch 156 can be oriented perpendicularly toward the second traverse edge 126 so that the catch 156 is directed toward the first light fixture 100 when aligned with the second light fixture 102 along the longitudinal alignment axis 104. To facilitate alignment, the retractor 150 and the catch 156 can be located midway between the upper and lower longitudinal edges 120, 122 at the same elevations with respect to the vertical direction 116. As will become apparent, aligning the retractor 150 and the catch 156 in the vertical direction 116 should assist in maintaining the first and second longitudinal edges 120, 122 parallel and co-linear with each other.

Figure 4:
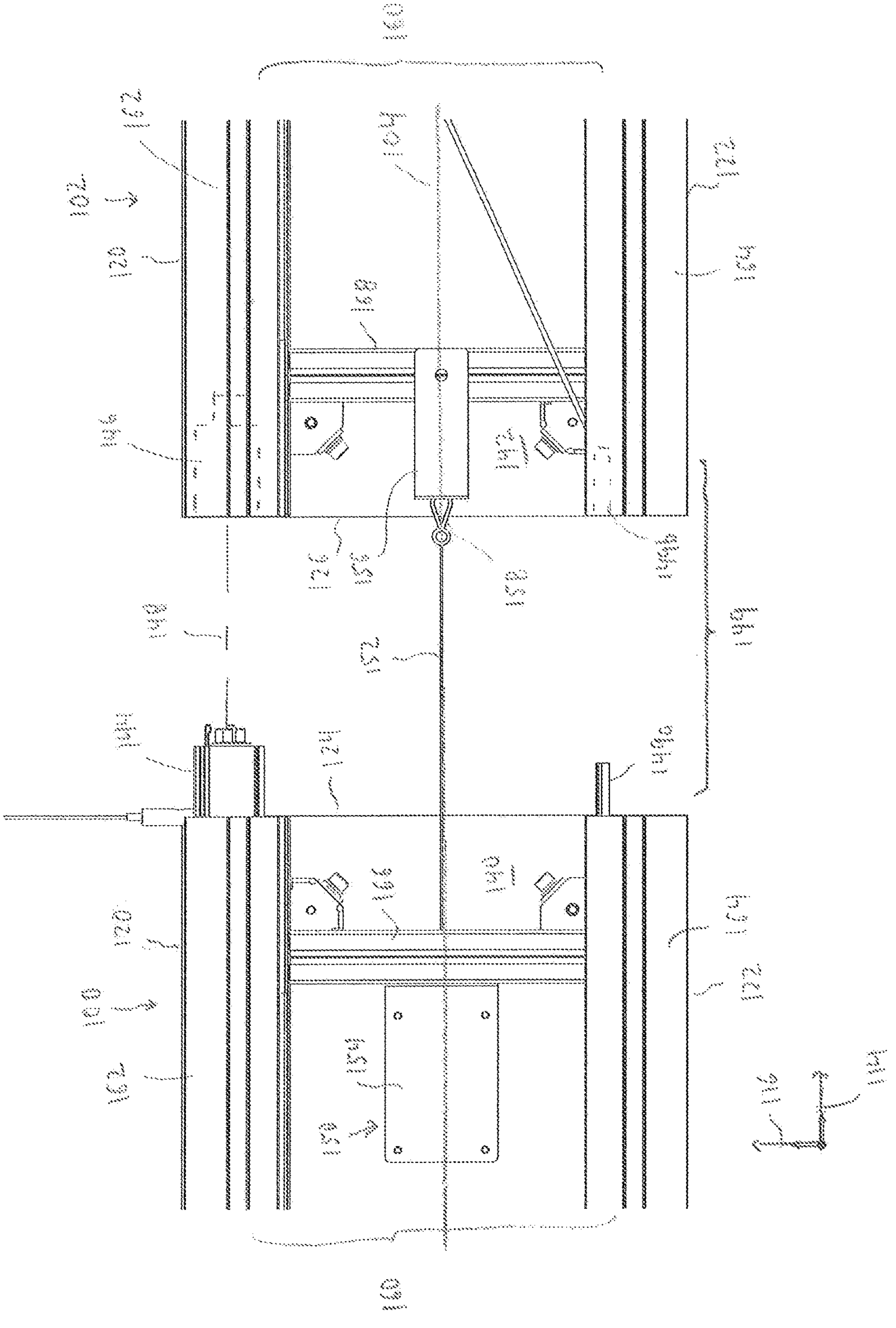
FIG. 4 illustrates the first and second light fixtures with the lanyard of the retractor extended and engaged to a catch locate in the second light fixture.

For example, referring to FIG. 4, lanyard 152 can be deployed from the retractor case 154 fixed to the first abutment end 140 of the first light fixture 100 and can be extended toward the second abutment end 142 of the second light fixture 102. An installer can grasp the hook 158 connected to the retracted lanyard 152 by hand to pull and deploy it from the retractor case 154. The flexibility of the lanyard 152 enables guiding the hook 158 into proximity with the catch 156. The hook 158 can be place around the corresponding protrusion on the catch 156 to secure and anchor the retractor 150 to the catch 156. The tensioning force 155 applied to the lanyard 152 by the retractor 150 pulls on the hook 158 in a manner keeping it engaged with the catch 156. When the first and second light fixtures 100, 102 are appropriately aligned with the longitudinal alignment axis 104, the lanyard 152 extends in a straight line between the first and second abutment ends 140, 142 perpendicular to the first and second traverse braces 166, 168.

Figure 5:
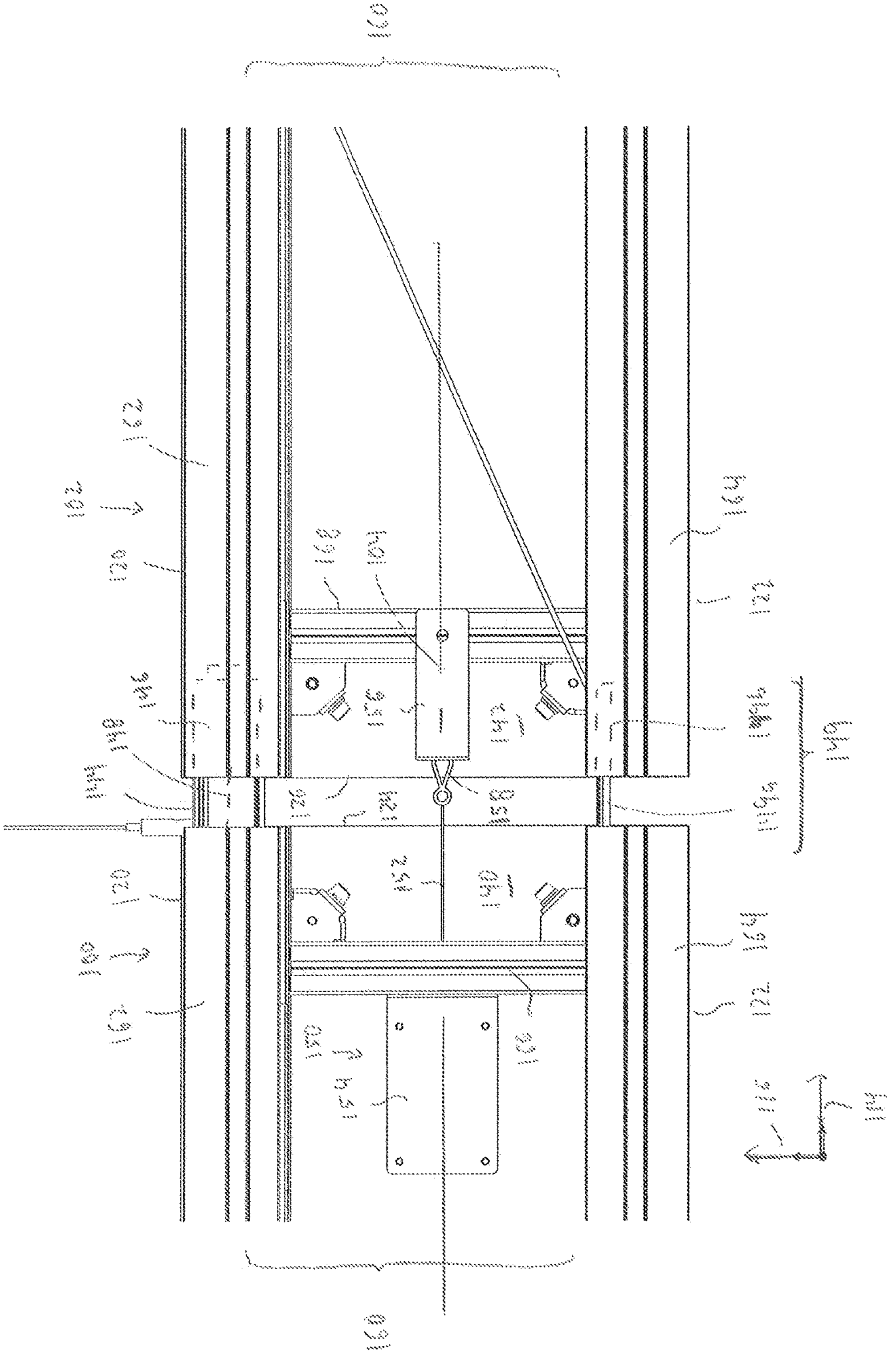
FIG. 5 illustrates the first and second light fixtures moved axially towards one another by retraction of the lanyard and with a first connector part mating with a second connector part.

Referring to FIG. 5, after the lanyard 152 has been extended from the first light fixture 100 has be secured and anchored to catch 156 on the second light fixture 102, the first and second light fixtures 100, 102 can be linearly moved together along the longitudinal alignment axis 104 to assemble the lighting arrangement 106. For example, installers may move the first and second light fixtures 100, 102 by hand along the longitudinal alignment axis 104 to bring the opposing first and second abutment ends 140, 142 into proximity. As the distance between the first and second abutment ends 140, 142 closes, the extended lanyard 152 is retracted into the retractor case 154 by the recoiling action of the retractor 150 and the tensioning force 155 applied to the lanyard 152.

Retraction of the extended lanyard 152 assists guiding the first and second abutment ends 140, 142 towards each other and into an adjoining relation. For example, the extension of the lanyard 152 between the first and second light fixtures 100, 102 provides a visible line that the installers can rely on to check that the first and second light fixtures are properly aligned, particularly with respect to being parallel to the longitudinal alignment axis 104 and equally elevated with respect to the vertical direction 116. The extended lanyard 152 is prevented from sagging due to the positive recoiling action of the retractor 150 that continuously retracts the lanyard into the retractor case 154. Additionally, the recoiling action of the retractor 150 can apply a tensioning force 155 pulling the first and second light fixtures 100, 102 together with respect to the longitudinal direction 114, which may further assist an installer in guiding the two abutment faces 140, 142 toward each other.

As the opposing first and second abutment faces 140, 142 are aligned and approach each other, the first connector part 144 on the first light fixture 100 can mate with the corresponding second connector part 146 on the second light fixture 102. For example, the first connector part 144 that extends from the first traverse edge 124, located parallel and vertically proximate to the upper longitudinal edge 120, can protrude past the opposing second traverse edge to 126 be received by the mating second connector part 146 that may be configured as a socket or receptacle. Similarly, the third connector part 149*a* extending from the first traverse edge 124 and parallel with the lower longitudinal edge 122 can be received in the mating fourth connector part 149*b*. By providing a visible line to assist alignment of the first and second light fixtures 100, 102, the retractor 150 and lanyard 152 also assist in alignment and guidance of the first and second connector parts 144, 146 and the third and fourth connector parts 149*a*, 149*b* into their mating connections Referring to FIG. 6, when the first and second light fixtures 100, 102 are adjacent and the first and second abutment ends 140, 142 contact one another, further retraction of the lanyard 152 into the retractor case 154 is no longer possible. The first and second traverse edges 124, 126 are flush and are preferably of uniform smoothness such that the junction between first and second light fixtures 100, 102 appears seamless. Further, the first and second light fixtures 100, 102 may be coequal in vertical elevation in relation to the vertical direction 116 such that the upper longitudinal edges 120 and the lower longitudinal edges 122 of the two structures are linearly co-aligned and parallel to the longitudinal alignment axis 104.

When the first and second abutment ends 140, 142 are placed in abutting relation, the exterior covers 130 of the first and second light fixtures 100, 102 can appear to merge at the juncture as shown in FIG. 1. For example, the first exterior panels 132 of both light fixtures 100, 102 can be co-planar and aligned with each other so that they produce a continuous, elongated profile. Further, as shown in FIG. 6, the first and second traverse edges 124, 126 can be coextensive having the same height in the vertical direction 116 so that the first and second light fixtures 100, 102 appear linearly continuous along the longitudinal alignment axis 104.

When the first and second abutment ends 140, 142 are in contact and the first and second light fixtures 100, 102 are adjoined, the lanyard 152 may remain partially extended due to the remaining linear spacing in the longitudinal direction 114 between the first traverse brace 166 and the second traverse brace 168. The recoiling action of the retractor 150 can continue to apply the tensioning force 155 in the longitudinal alignment axis 104 to the lanyard 152 pulling the catch 156 to which it is engaged, and thus the internal support frame 160 of the second light fixture 102 toward the first light fixture 100. While the lanyard 152 remains partially extended, the tensioning force 155 remain present and constant and will continue to positively draw and hold the first and second abutment ends 140, 142 in abutting contact.

The tensioning force 155 applied by recoiling action of the retractor 150 transfers the suspension load associated with the first and second light fixtures 100, 102 to the adjoining internal support frames 160 that may be in rigid abutting contact. The tensioning force 155 relieves the installers of having to maintain the first and second light fixtures 100, 102 in alignment while completing assembly of the lighting arrangement 106, for example, by installing secondary hardware to secure the first and second light fixtures together. The retractor 150 provides an additional benefit in that, if one of the light fixtures were to slip, the lanyard 152 would limit the displacement or travel distance between the light fixtures.

Figure 6:
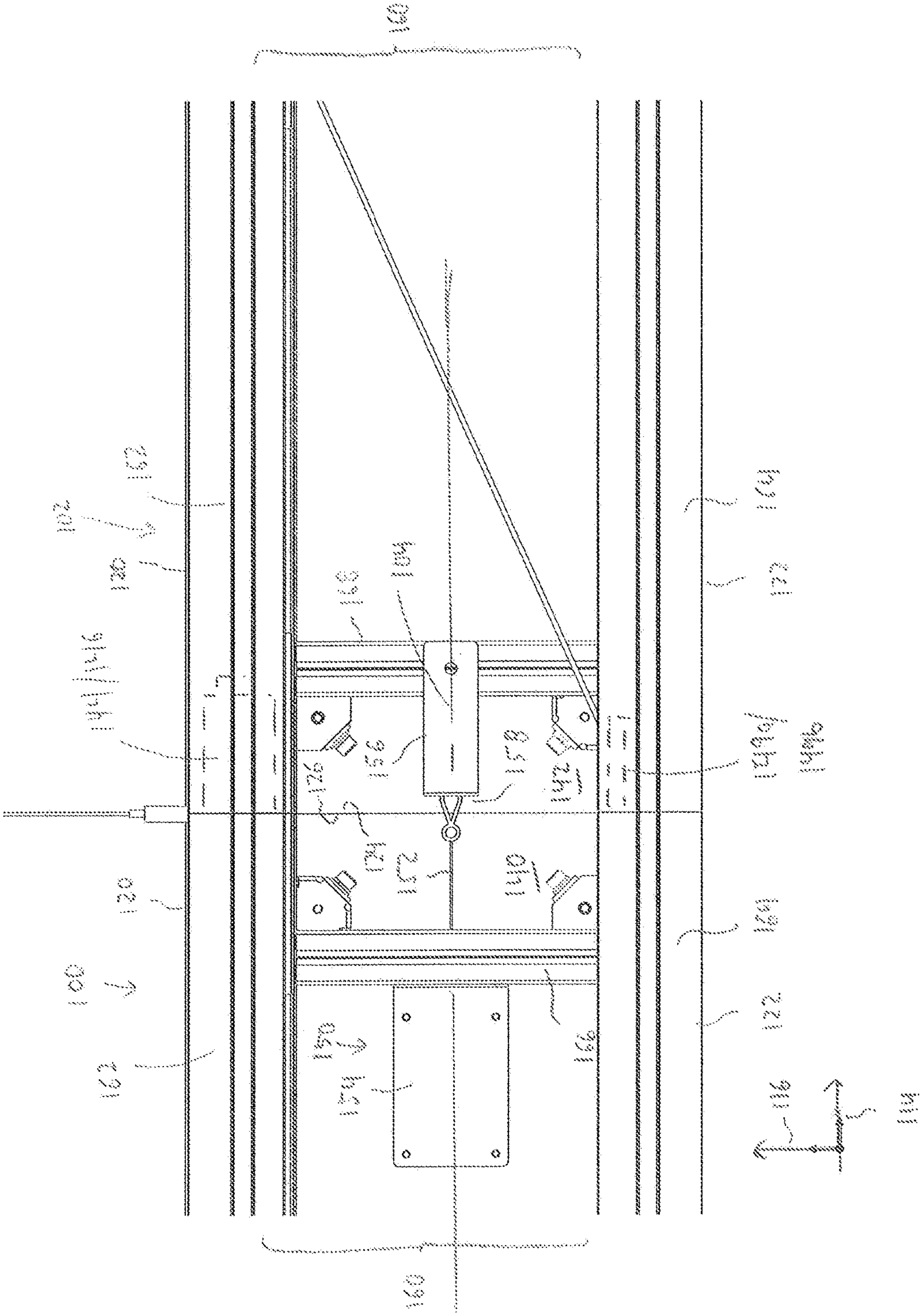
FIG. 6 illustrates the first and second light fixtures moved into an axially adjoining and contiguously abutting relation such that the exterior covers form a seamless coplanar surface.

Illustrated in the embodiment of FIG. 6, the suspension cable 112 can joined to the upper longitudinal edges 120 of the first and second exterior panels 100, 104 at the junction between the first and second adjoining abutment ends 140, 142. A single suspension cable 112 can carry the load of the first and second light fixtures 100, 104 and reduce the number of suspension cables 112 necessary to support the lighting arrangement 106, further the aesthetic appearance. To directly transfer the load of the first and second exterior panels 100, 102, the suspension cable 112 can be directly connected and joined with the upper longitudinal chord 162 of the internal support frames 160 of the respective exterior panels.

Figure 7:
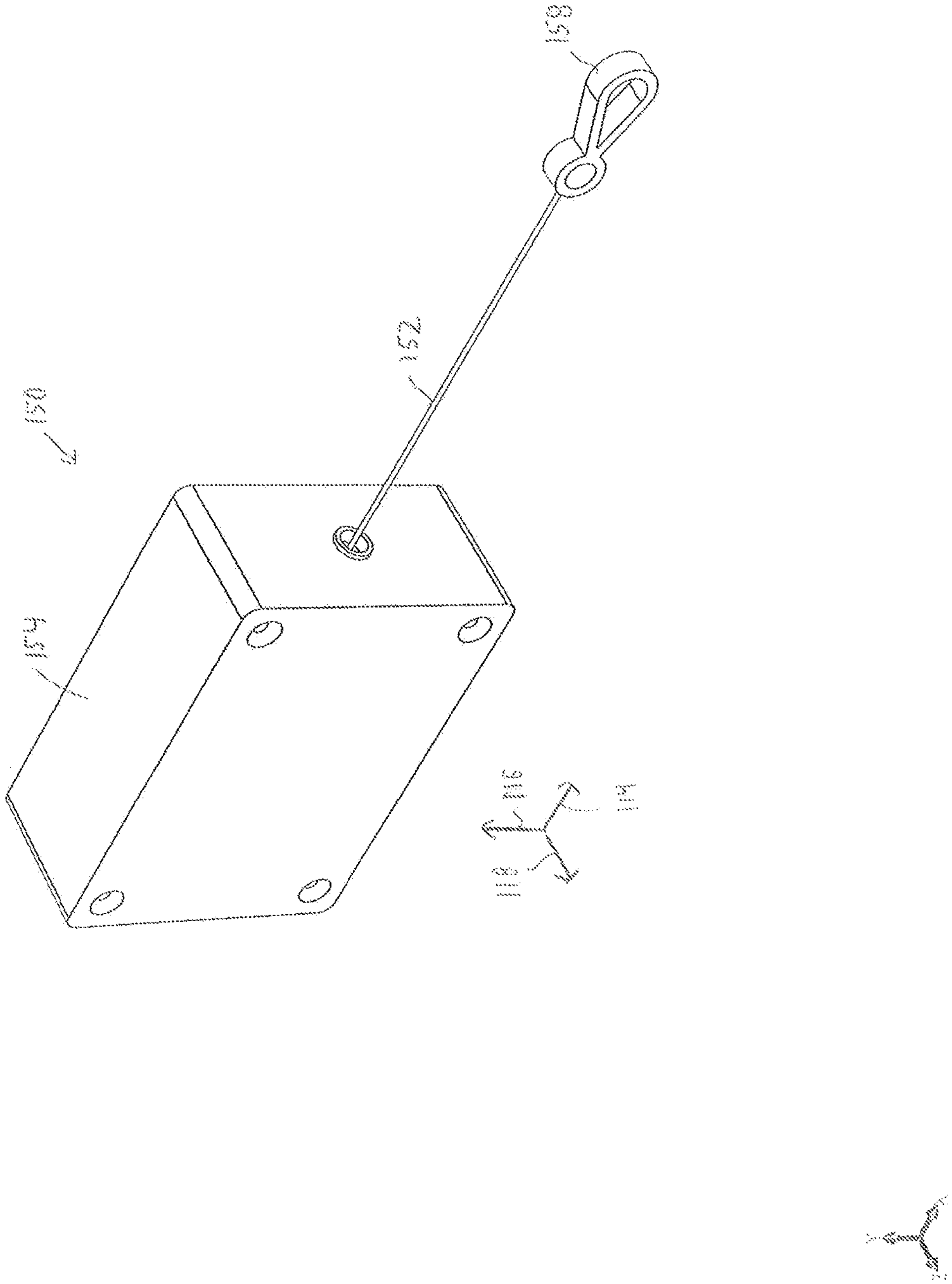
FIG. 7 illustrates an example of a retractor with an extendable lanyard for the light fixtures, in accordance with an embodiment of the disclosure.

Referring to FIG. 7, the retractor 150 may be a compact, self-contained structure and the retractor case 154 can be a cubic box. The lanyard 152 can be extendable from an aperture located in face of the retractor case 154 and can be prevented from being pulled there through by the hook 158. The compact uniform design of the retractor 150 enables its attachment to different location or configurations on the internal support frame 160 of the lighting fixtures 100, 102, and may enable use of the retractor 150 with different designs and styles of the lighting fixtures.

Figure 8:
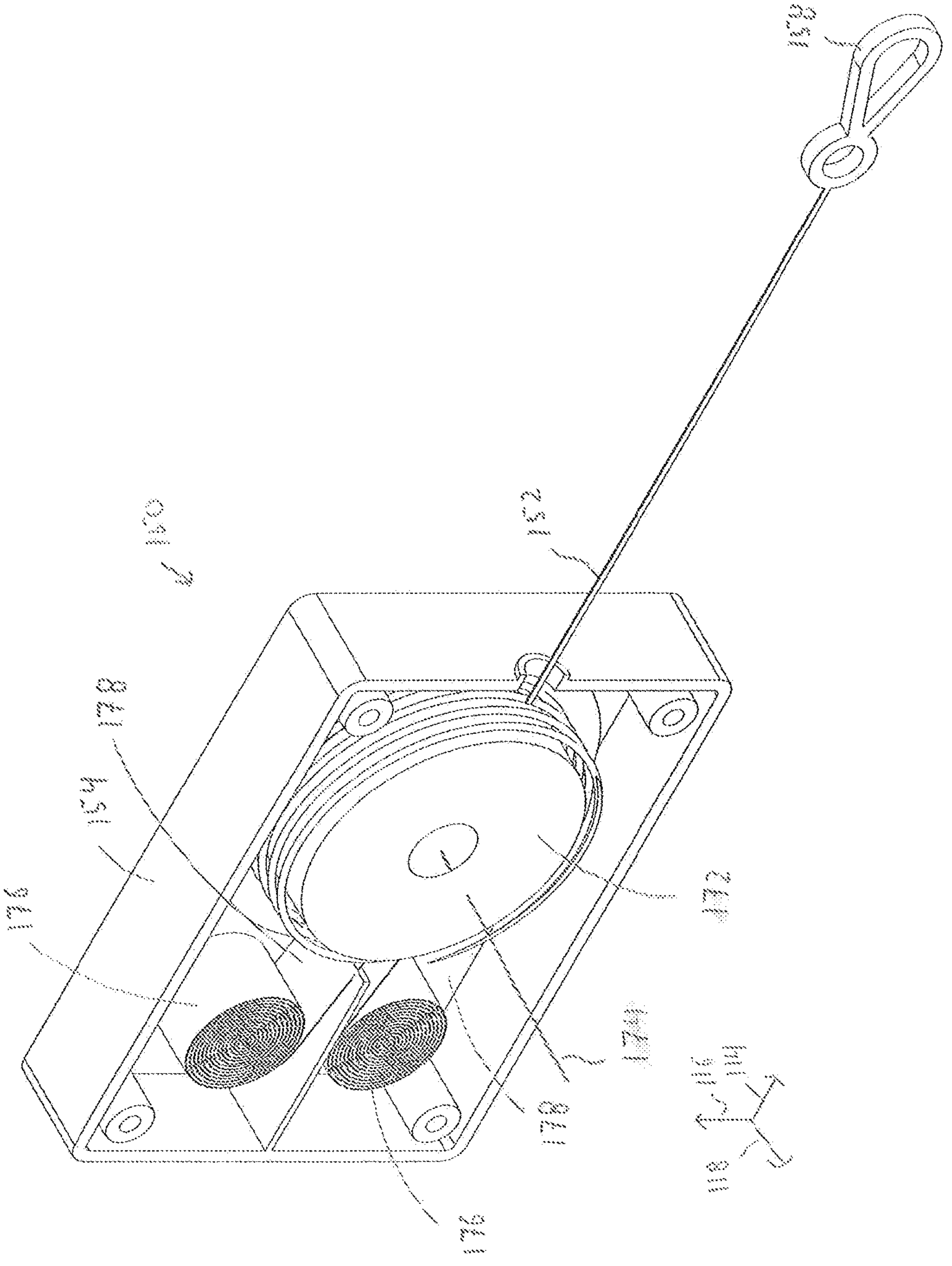
FIG. 8 illustrates the internal components including spiral torsion springs and their operative arrangement of the example of the retractor in FIG. 7.

Referring to FIG. 8, to enable extension and retraction of the lanyard 152, the retractor 150 can include a spool or reel 172, which may be a cylindrical structure around which the flexible lanyard 152 can be wrapped. The reel 172 can be supported to rotate inside the retractor case 154 and can define a rotation axis 174 that, when the retractor 150 is installed, can be oriented perpendicular to the longitudinal alignment axis 104.

To produce the recoiling action, one or more spiral torsion springs 176 can be included inside the retractor case 154 and are operatively associated with the rotating reel 172. The spiral torsion springs 176 can be made of a long strip 178 of spring steel that is wound upon itself into a spiral. The free end of the steel strip 178 is fixed to the rotating reel 172 such that when the lanyard 152 is deployed and extend, the spiral torsion spring 176 will correspondingly unwind. The spring steel of the steel strip 178 may have a high yield strength causing it to return to the spirally coiled configuration, and thus creating the recoiling action and the tensioning force 155 as shown applied in the figures.

Figure 9:
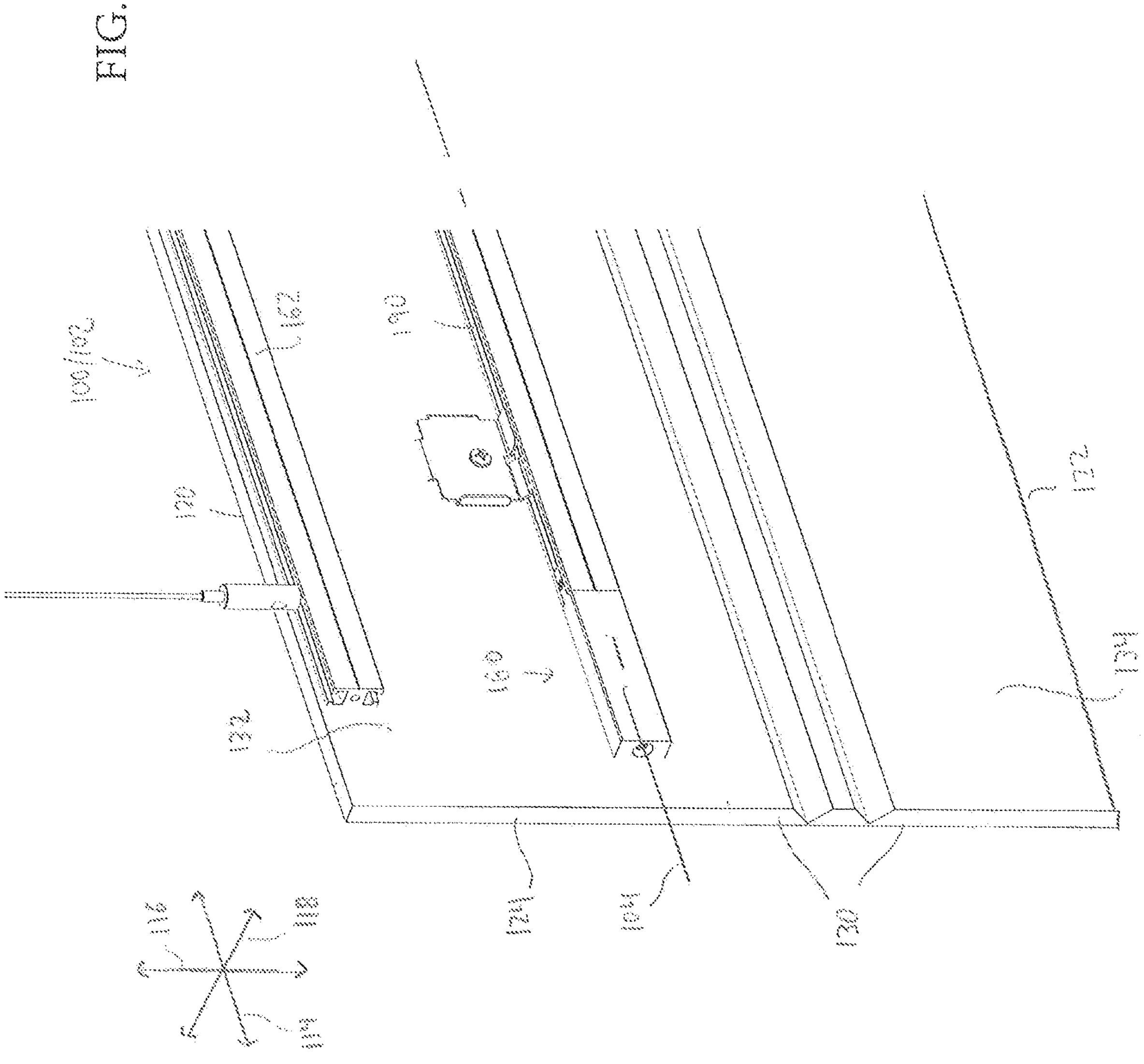
FIG. 9 illustrates another example of a retractor that can be associated with longitudinal chord attached to the interior of a light fixture, in accordance with an embodiment of the disclosure.
Figure 10:
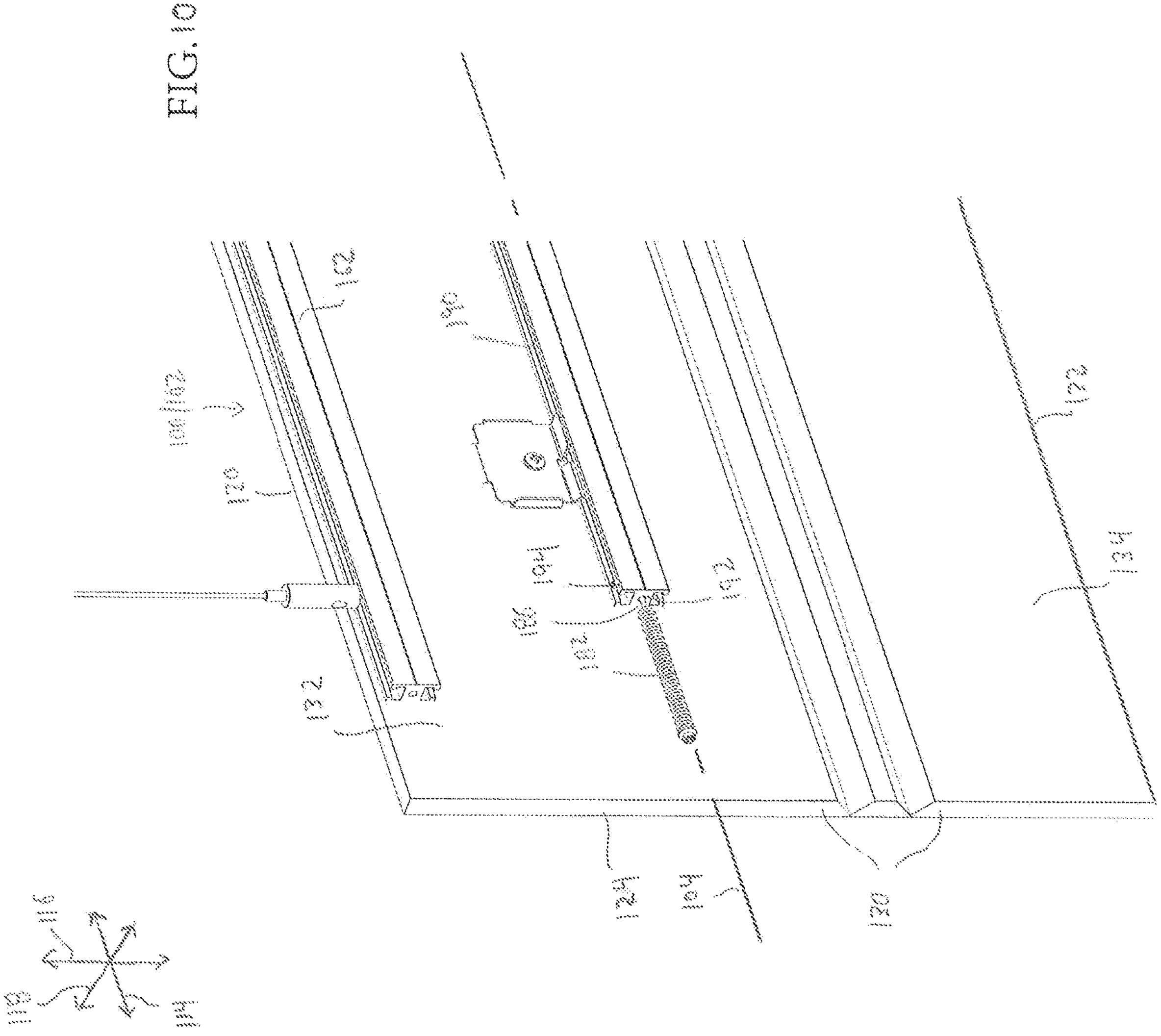
FIG. 10 illustrates the example of the retractor of FIG. 9 with the retractor case removed to illustrate the helical coil spring arranged to apply a tensioning force to the lanyard.

Various modifications are contemplated for design and configuration of the retractor in order to generate the recoiling action that pulls the first and second lighting fixtures 100, 102 together. For example referring to FIGS. 9 and 10, there is illustrated an embodiment in which the retractor 180 can include a helical coil spring 182 to produce the recoiling force that applies the tensioning force tending to hold the first and second lighting fixtures together. The helical coil spring 182 can be a made from an elongated length or rod of metal helically wound around itself to form a cylinder defining a spring axis 183 and can apply tensioning or compression forces depending upon how it is loaded. For example, depending upon the loading, the helical coil spring 182 can expand and retract in axial length with respect to the spring axis.

The helical coil spring 182 can be accommodated in a retractor housing 184 that can be fastened or attached to an interior surface of the exterior cover 130 of one of the first or second light fixtures 100, 102. The retractor housing 184 can be a box-like structure that may be placed over and enclose the helical coil spring 182 for protection and to prevent contamination. In the illustrated embodiment, the exterior cover 130 can be formed from a first exterior panel 132 and a second exterior panel 134 that are joined at the lower longitudinal edges 122 by a living hinged that allows the first and second exterior panels 132, 134 to be folded into a parallel, opposed relation to each other.

To join and pull together multiple lighting fixtures 100, 102 in an aligned and abutting relation, the retractor 180 includes a lanyard 186 in the embodiment of a flexible wire rope. In other embodiments, the retractor 180 may use a tie rod, which can be long slender structural unit able to apply a tensile load, in place of the flexible lanyard. The lanyard 186 can be disposed coaxially through the center of the helical spring coil 182 along the spring axis 183 and can also extend parallel to the longitudinal alignment axis 104. The lanyard 186 can be joined and fixed with an end of the helical coil spring 182.

The retractor 180 can be configured to operate in association with another of longitudinal chord 190 that, like the upper and lower longitudinal cords 162, 164, can extend parallel to the longitudinal alignment axis 104. For example, the longitudinal chord 190 can be mounted to an interior surface of the exterior cover 130 and can extend in the longitudinal direction 114 across a substantial length of the lighting fixtures 100, 104. Like the other longitudinal chords, the longitudinal chord 190 can be manufactured from an elongated extrusion of structural metal such as a channel. To receive the lanyard 186, the longitudinal chord 190 can include a longitudinal aperture 192 that extends lengthwise through the center of the structure. When the longitudinal chord 190 is attached to the exterior cover 130, the longitudinal aperture 192 aligns in parallel with the longitudinal axis 104.

Figure 11:
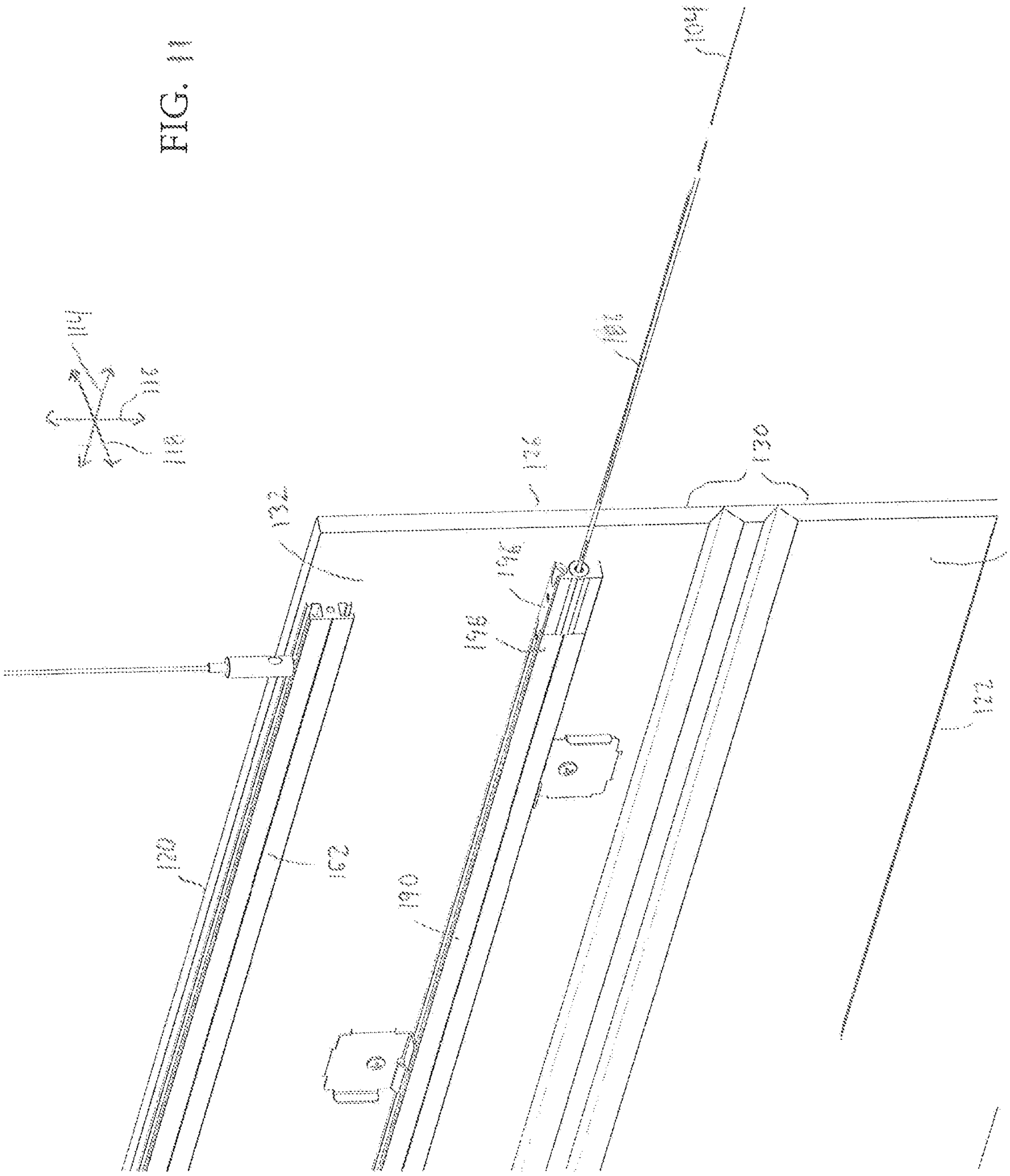
FIG. 11 illustrates an example of a catch in the embodiment of a termination clamp that can be included in the interior of a light fixture to engage and secure to the distal end of the lanyard.

When the retractor 180 is assembled to the first exterior panel 100, the lanyard 186 can extend into the rod aperture 192 at the first end 194 of the longitudinal chord 190. The lanyard 186 can traverse the length of the first lighting fixture 100 and can extend to and be joined with the adjacently aligned second lighting fixture 102. Referring to FIG. 11, to engage and secure with the extended lanyard 186, the second light fixture 102 can include a catch in the embodiment of a termination clamp 196 that can be attached to the interior surface of the exterior cover 130. The termination clamp 196 can be located at the second end 198 of a longitudinal chord 190 attached to the exterior cover 130 and is thus aligned with the longitudinal aperture 192 that may be disposed through the longitudinal chord 190. The termination clamp 196 can be configured to apply a radially compressive force to secure the lanyard 186 that is received therein.

To draw the first and second light fixtures 100, 102 together in compression, as illustrated in FIG. 1, the longitudinal length of the lanyard 186 can be slightly shorter than as required to extend the longitudinal length between the first and second ends 194, 198 of two aligned longitudinal chords 190 on the two adjacently positioned exterior panels. This compresses the spiral torsion spring 182 against the first end of the respective longitudinal chord 190 which causes the spiral torsion spring to react by applying a tensioning force to the lanyard 186. The adjacent first and second light fixtures 100, 102 are thus abutted together by the tensile load from spiral torsion spring.

In an embodiment, additional light fixtures can be assembled intermediately between the first and second light fixtures 100, 102 illustrated in FIG. 1. The additional light fixtures can also include a longitudinal chord 190 having a longitudinal aperture 192 extending lengthwise through the structure. The lanyard 186 can be directed through and traverse the length of the longitudinal chord 190 on the additional exterior panel such that the lanyard extends between a retractor 180 associated with the first exterior panel 100 and a termination clamp 196 associated with the second exterior panel 102. The helical spring coil 182 can continue to apply a tensioning force to the lanyard 186, thereby pulling the first and second light fixtures axially against the intermediate additional light fixture with respect to the longitudinal alignment axis 104 to hold the lighting assembly 106 together in an aligned, uniform structure.

Figure 12:
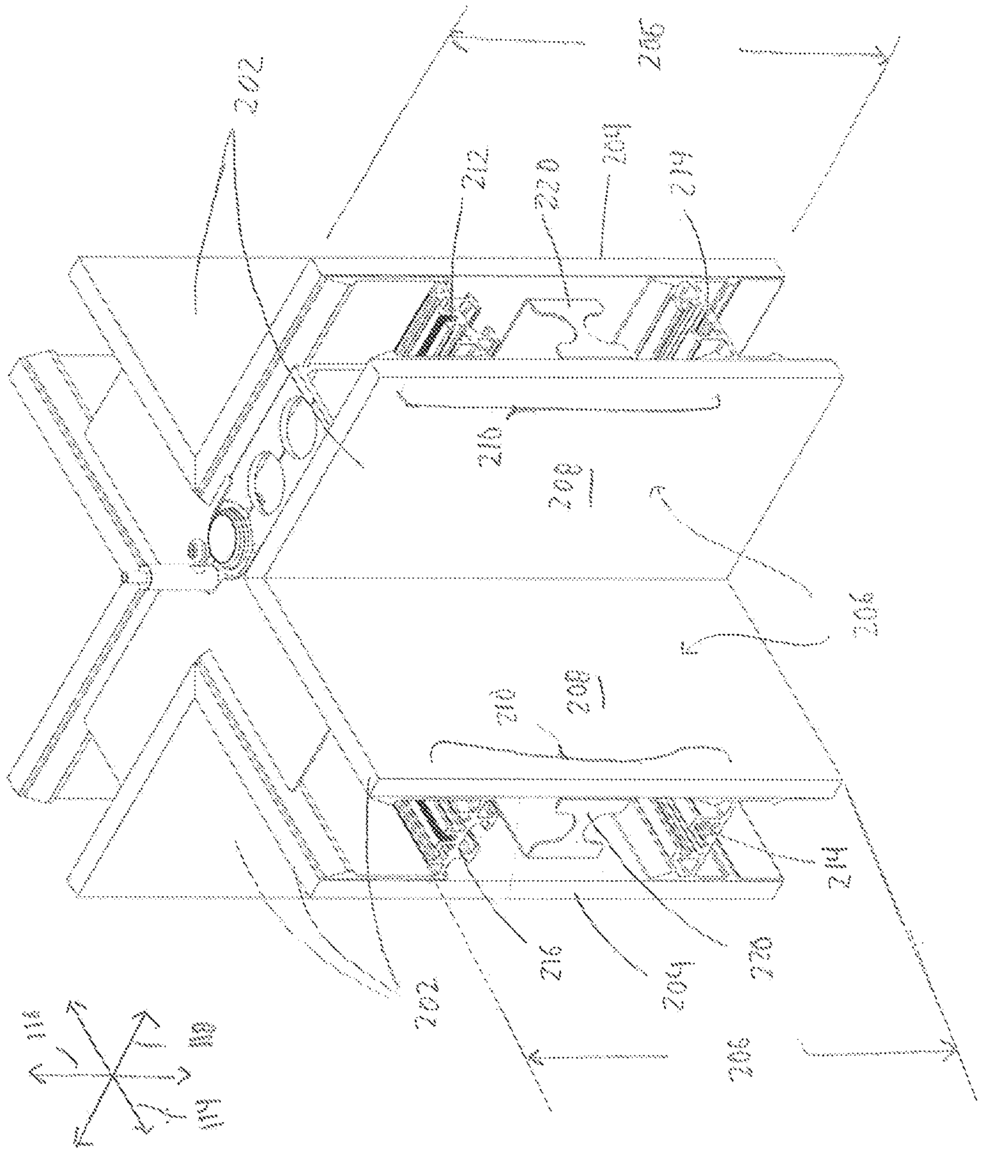
FIG. 12 illustrates a junction hub for aligning and adjoining a plurality of light fixtures in a non-linear or non-coplanar arrangement, in accordance with an embodiment of the disclosure.
Figure 13:
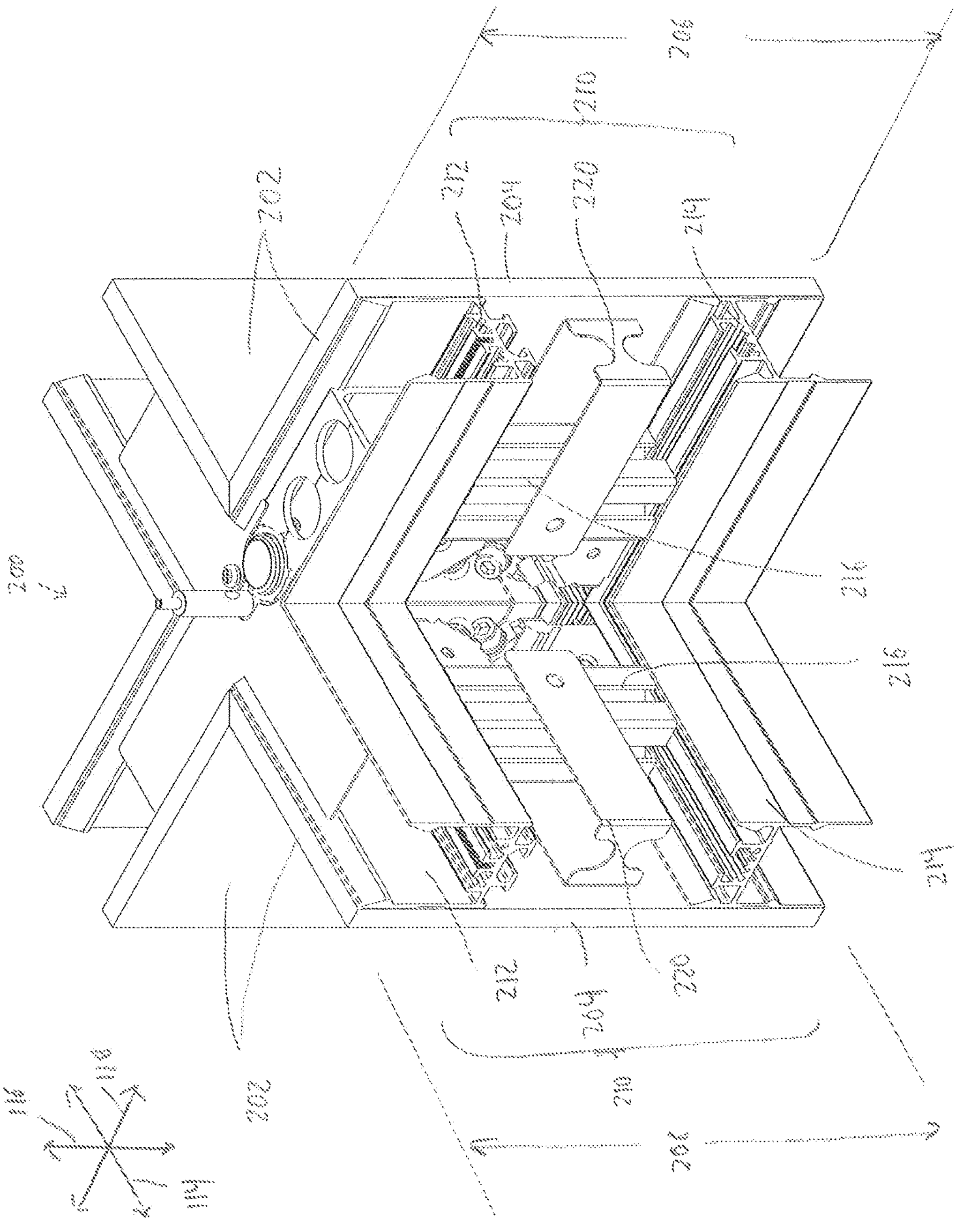
FIG. 13 illustrates the junction hub of FIG. 12 with the exterior tailpieces removed to illustrate the internal support frame.

Referring to FIGS. 12 and 13, there is illustrated an embodiment of a junction hub 200 that can be used to interconnect the light fixture 100, 102 of the lighting assembly 106 at angular arrangement which are not co-planar. For example, the junction hub 200 can be configured as a cross to connect four linear light fixtures in an orthogonal arrangement in which the four light fixtures are disposed at right angles to each other. In other embodiments, the junction hub 200 can be configured to join different numbers of panels in different arrangements, for example, two light fixtures at non-coplanar angles, e.g., right angles, three light fixtures in a Y- or T-configuration, etc.

The junction hub 200 can include a plurality of exterior tailpieces 202, which in accordance with the illustrated embodiment are arranged to form a geometric cross.

Accordingly, the exterior tailpieces 202 protrude and are aligned in the longitudinal direction 114 and the lateral direction 118 to establish the shape of the geometric cross. The exterior tailpieces 202 can be planar and can be made of the same or similar semi-rigid, non-fibrous material as the exterior cover 130 of the light fixtures.

To visually merge as part of the lighting arrangement, the exterior tailpieces 202 can each be designed with a junction abutment 204 located at the distal edge of the tailpiece that is configured to adjoin and abut the corresponding abutment ends 140, 142 of the first and/or second light fixtures 100, 102. For example, the junction abutment 204 may define a tailpiece height 206 in the vertical direction that dimensionally corresponds with the height of the light fixtures 100, 102 between the upper and lower longitudinal edges 120, 122. The exterior tailpieces 202 can also have a smooth, flat exterior surface 208 to visibly blend flush with the exterior surfaces of the exterior covers 130 of the light fixtures 100, 102, although, where appropriate, the exterior surface 208 can be patterned, embossed, etc.

To support the plurality of exterior tailpieces 202, the junction hub 200 can also include an internal junction frame 210 to which the tailpieces are attached. The internal junction frame 210 can include an upper channel 212 and a lower channel 214 that are parallel and spaced apart from each other. The upper and lower channels 212, 214 can be made from extruded metal although may also have other constructions or designs. To interconnect to the parallel upper and lower channels 212, 214, the internal junction frame 210 can also include one or more traverse support braces 218 that are attached perpendicularly and extend between the upper and lower channels. The support braces 218 may also be an extruded metal component.

To attach and draw the light fixtures adjacent, the internal junction frame 210 can include a catch 220, as described above, that is attached to the traverse support brace 218. The catch 220 can be arranged perpendicular to the traverse support brace 218 and extend perpendicularly to the upper and lower channel 212, 214 in the longitudinal and/or lateral directions 114, 116 respectively.

To assemble the lighting arrangement, the first abutment end 140 of one of the first or second light fixtures 100, 102 can be aligned and placed adjacent to one of the junction abutments 204 orthogonally arranged on the junction hub 200. The lanyard 152 can be deployed from the retractor 150 so the hook 158 is proximate with and engages the catch 220. The recoiling action of the retractor 150 can pull the first abutment end 140 of the light fixtures 100, 102 contiguously flush to the junction abutment 204 to produce a seamless junction.

In other possible embodiments, the arrangement of the retractor 150 and the catch 220 can be reversed, with the retractor 150 located on the junction hub 200. Also in further possible embodiments, the junction hub 200 can be configured as a terminator that terminates the linear alignment of adjacent light fixtures 100, 102. The junction hub 200 may or may not be configured with a lighting source located in the interior to project light downwardly in the vertical direction 116.

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A modular lighting fixture comprising:

an external cover including at least one exterior panel defining a upper longitudinal edge and a lower longitudinal edge both extending parallel with a longitudinal alignment axis; the external cover further include a first abutment end and a second abutment end located opposite each other with respect to the longitudinal alignment axis;

an internal support frame located in an interior defined by the external cover;

a retractor having an deployable lanyard, the retractor attached to the internal support frame and disposed toward the first abutment end; and a catch to engage the lanyard, the catch attached to the internal support frame and disposed toward the second abutment end.

2. The modular lighting baffle of claim 1, wherein the retractor applies a tension force to the lanyard when extended.

3. The modular lighting fixture of claim 2, wherein the retractor and the catch are mounted approximately mid-distance between the upper longitudinal edge and the lower longitudinal edge.

4. The modular lighting fixture of claim 3, wherein the retractor is attached to the internal support frame to orientate the lanyard in the direction of the longitudinal alignment axis.

5. The modular lighting fixture of claim 2, wherein the retractor includes a spiral torsion spring to apply the tension force to the lanyard.

6. The modular lighting fixture of claim 2, wherein the retractor includes a helical coil spring to apply the tensioning force to the lanyard.

7. The modular lighting fixture of claim 1, wherein the internal support frame includes a first traverse brace and a second traverse brace, each located generally between the upper and lower longitudinal edges, the first traverse brace located proximate the first abutment end and the second traverse brace located proximate the second abutment end.

8. The modular lighting fixture of claim 7, wherein the retractor is attached to the first traverse brace and the catch is attached to the second traverse brace.

9. The modular lighting fixture of claim 1, wherein the external cover further includes a second exterior panel, generally parallel and in an opposing relation to the first exterior panel.

10. The modular lighting fixture of claim 9, wherein the first exterior panel and the second exterior panel are made from a semi-rigid fibrous material.

11. A method of installing a lighting arrangement comprising:

suspending a first modular light fixture to establish a longitudinal alignment axis, the first modular light baffle fixture including a first external cover defining a first interior;

deploying a lanyard from a retractor disposed within an interior of the modular light fixture to extend beyond the first modular light fixture;

aligning a second modular light fixture with respect to the longitudinal alignment axis in an axially spaced, successive arrangement with the first modular light fixture;

engaging the lanyard to a catch disposed within a second interior of a second modular light fixture;

applying a tensioning force to the lanyard with the retractor to move the second modular light fixture into an axially adjoining arrangement with the first modular light fixture.

12. The method of claim 11, wherein the first modular light fixture includes a first abutment end and the second modular light fixture includes a second abutment end, the first and second abutment ends located traverse to the longitudinal alignment axis and in abutting contact with each other when the first and second modular light fixtures are in the axially adjoining successive arrangement.

13. The method of claim 12, wherein applying the tensioning force to the lanyard moves a first exterior cover panel of the first exterior cover into coplanar alignment with a second exterior panel of the second exterior cover.

14. The method of claim 13, wherein the first exterior cover and the second exterior cover align to form a continuous planar surface.

15. The method of claim 14, wherein the first exterior cover and the second exterior cover are made of a semi-rigid fibrous material.

16. The method of claim 11, further comprising mating a first connector part extending from the first abutment end to a second connector part disposed in the second interior.

17. The method of claim 16, wherein the first connector part and the second connector part align with a mating direction parallel to the longitudinal alignment direction.

18. A lighting arrangement comprising:

a plurality of the modular light fixtures, each modular light fixture comprising:

an exterior cover having a first exterior panel and an opposing, parallel second exterior panel extending parallel with respect to a longitudinal alignment axis;

an internal support frame located between and supporting the first exterior panel and the second exterior panel;

a retractor including a lanyard, the retractor mounted to the internal support frame toward a first abutment end and arranged to direct the lanyard along the longitudinal alignment axis; and a catch attached to the internal support frame located toward a second abutment face configured to engage the lanyard.

19. The lighting arrangement of claim 18, wherein a first modular light fixture and a second modular light fixture of the plurality are arranged in an axially adjoining successive arrangement.

20. The lighting arrangement of claim 19, wherein the retractor of the first modular light fixture applies a tensioning force to the lanyard, thereby holding the second modular light fixture in adjoining contact with the first baffle lighting fixture respectively along the first abutment end and the second abutment end.

* * * * *